US008165625B2

(12) United States Patent  
Cheng

(10) Patent No.: US 8,165,625 B2  
(45) Date of Patent: Apr. 24, 2012

(54) MOBILE COMMUNICATION DEVICE CAPABLE OF PERFORMING GROUP COMMUNICATION BETWEEN A CELLULAR COMMUNICATION SYSTEM AND A VOIP SYSTEM

(75) Inventor: Chao-Kuo Cheng, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 923 days.

(21) Appl. No.: 11/861,249

(22) Filed: Sep. 25, 2007

(65) Prior Publication Data

US 2008/0119227 A1     May 22, 2008

(30) Foreign Application Priority Data

Nov. 22, 2006    (TW) ................................ 95143174 A

(51) Int. Cl.  
*H04M 1/00*     (2006.01)

(52) U.S. Cl. ................. 455/552.1; 455/553.1; 455/11.1; 370/293; 370/279

(58) Field of Classification Search ............... 455/550.1, 455/552.1, 553.1, 11.1; 370/293, 279  
See application file for complete search history.

(56) References Cited

U.S. PATENT DOCUMENTS

| | | | |
|---|---|---|---|
| 2006/0077956 A1* | 4/2006 | Saksena et al. | 370/352 |
| 2006/0146701 A1* | 7/2006 | Barnes et al. | 370/229 |
| 2007/0140255 A1* | 6/2007 | Gautier et al. | 370/395.5 |
| 2007/0165653 A1* | 7/2007 | Wiatrak et al. | 370/401 |
| 2007/0195743 A1* | 8/2007 | Karaoguz | 370/338 |

FOREIGN PATENT DOCUMENTS

| | | |
|---|---|---|
| CN | 1843047 A | 10/2006 |
| KR | 20010035305 A | 5/2001 |
| TW | I261455 | 9/2006 |
| TW | 200638735 | 11/2006 |

\* cited by examiner

*Primary Examiner* — Wayne Cai  
*Assistant Examiner* — Aung Win  
(74) *Attorney, Agent, or Firm* — Winston Hsu; Scott Margo

(57) ABSTRACT

A mobile communication apparatus capable of performing group communication between a cellular communication system and a VoIP system includes a first wireless communication module for processing signals of a cellular network corresponding to the cellular communication system, a second wireless communication module for processing signals of a WLAN corresponding to the VoIP system, and a control module coupled to the first wireless communication module and the second wireless communication module, for establishing voice communications with the cellular network and the WLAN through the first wireless communication module and the second wireless communication module, and for exchanging signals of the first wireless communication module and the second wireless communication module when the mobile communication apparatus operates in a first operation mode.

13 Claims, 3 Drawing Sheets

MOBILE COMMUNICATION DEVICE CAPABLE OF PERFORMING GROUP COMMUNICATION BETWEEN A CELLULAR COMMUNICATION SYSTEM AND A VOIP SYSTEM

BACKGROUND OF THE INVENTION

1. Field of the Invention

The present invention relates to a mobile communication apparatus, and more particularly, to a mobile communication apparatus capable of performing group communication between a cellular communication system and a VoIP system.

2. Description of the Prior Art

Mobile communication has become a boom industry during recent years. Many kinds of wireless communication technologies have been developed. Taking mobile phone systems for example, there are several kinds of widely applied mobile phone systems, which are the GSM system (which stands for Global System for Mobile Communications), the CDMA system (which stands for Code Division Multiple Access system), and the WCDMA system (which stands for Wideband Code Division Multiple Access system), etc.

The reduction in cost of the mobile phones has placed them in the affordable range of most people. Due to the rapid progress in technology, more functional and powerful mobile phones are constantly being invented. In order to meet customers' demands, the mobile phone manufacturers often add many new functions and techniques to the mobile phone. For example, a digital camera function and an external keyboard interface are embedded in most of the latest mobile phone, both increasing convenience and enhancing the users' lifestyle.

In other aspects, due to the popularity of personal computers (PCs) and the Internet, a VoIP system (which stands for Voice over Internet Protocol system) has been developed. The VoIP system provides an alternate selection for users to communicate with each other instead of utilizing a traditional phone. Generally, the VoIP system utilizes a specific program run on the PC for exchanging audio packets to provide high-quality voice communications through the Internet. Furthermore, due to the wider band of the Internet, the VoIP system not only provides real-time voice communications, but also provides additional services such as image transmitting and file exchanging. Therefore, users are not limited to utilizing a traditional telecommunications (telecom) system. In addition, the VoIP system saves users money because users pay a low price charged by the Internet service provider rather than the comparably higher price charged by the telecom system provider.

In order to combine the advantages of both the cellular communication system and the VoIP system, a dual-mode mobile communication apparatus such as a personal digital assistant phone (Wi-Fi phone) has been developed. However, the telecom system provider for the cellular communication system and the Internet service provider for the VoIP system are different, and the communication techniques are also different. Therefore, if there is no cross-link service provided by the cellular communication system and the VoIP system, the cross-network group communication among the dual-mode mobile communication apparatus, the cellular communication system, and the VoIP system cannot be achieved, which places inconvenient limitations on the users.

SUMMARY OF THE INVENTION

The present invention provides a mobile communication apparatus capable of performing group communication between a cellular communication system and a VoIP system. The mobile communication apparatus comprises a first wireless communication module for processing signals of a cellular network corresponding to the cellular communication system; a second wireless communication module for processing signals of a wireless local area network (WLAN) corresponding to the Voice over Internet Protocol (VoIP) system; and a control module, coupled to the first wireless communication module and the second wireless communication module, for establishing voice communications with the cellular network and the WLAN through the first wireless communication module and the second wireless communication module, and for exchanging signals of the first wireless communication module and the second wireless communication module when the mobile communication apparatus operates in a first operation mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
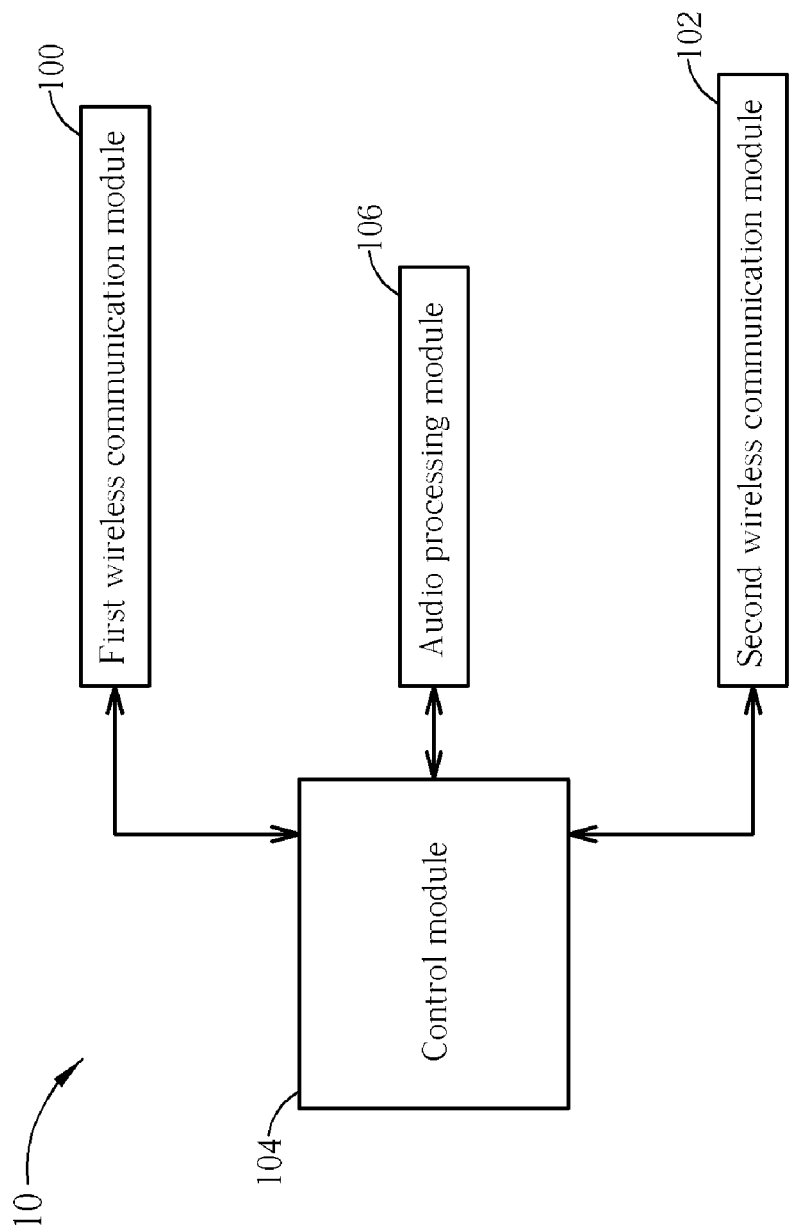
FIG. 1 is a schematic diagram illustrating a mobile communication apparatus according to one embodiment of the present invention.

Please refer to FIG. 1. FIG. 1 is a schematic diagram illustrating a mobile communication apparatus 10 according to one embodiment of the present invention. The mobile communication apparatus 10 is able to perform cross-network group communication between a cellular communication system and a VoIP system. The cellular communication system can be a communication system based on a Global System for Mobile Communications, a Code Division Multiple Access system, or a Wideband Code Division Multiple Access system, etc. The VoIP system can be a communication system based on a wireless local area network. The transmission protocol of the wireless local area network can be an IEEE 802.11x, a Wi-Fi, a Wi-MAX, and a WiBro, etc.

The mobile communication apparatus 10 comprises a first wireless communication module 100, a second wireless communication module 102, a control module 104, and an audio processing module 106. The first wireless communication module 100 is utilized to process signals of a cellular network corresponding to the cellular communication system. The second wireless communication module 102 is utilized to process signals of a wireless local area network corresponding to the VoIP system. The control module 104 controls signals of the first wireless communication module 100 and the second wireless communication module 102 based on an operation mode of the mobile communication apparatus 10. The audio processing module 106 is utilized to receive and play out voice signals.

Based on the operation mode of the mobile communication apparatus 10, the control module 104 is able to control the operations of the first wireless communication module 100 and the second wireless communication module 102 for establishing voice communications with the cellular communication system or the VoIP system and performing group communication.

Figure 2:
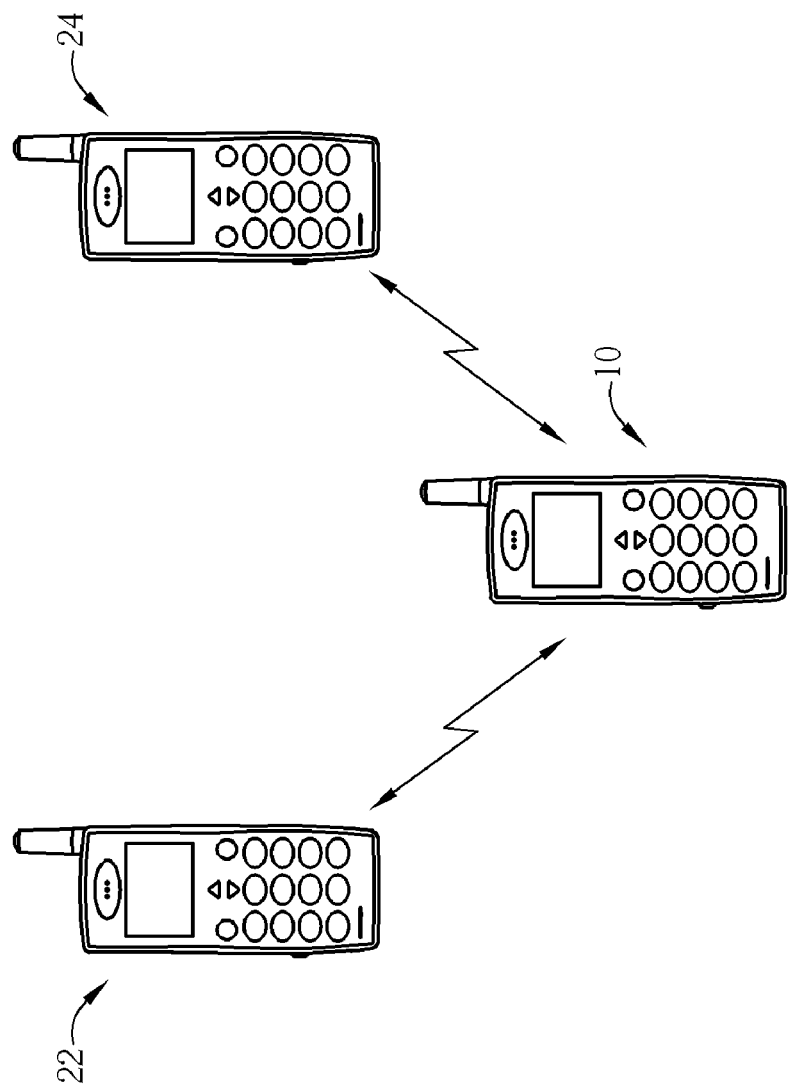
FIG. 2 is a schematic diagram illustrating voice communications established between different mobile communication apparatuses.

Please refer to FIG. 2. FIG. 2 is a schematic diagram illustrating voice communications established between the mobile communication apparatus 10 and mobile communication apparatuses 22 and 24. The mobile communication apparatus 22 is a communication apparatus of the cellular communication system such as a GSM mobile phone. The mobile communication apparatus 24 is a communication apparatus of the VoIP system such as a Wi-Fi phone.

When the mobile communication apparatus 10 operates in a first operation mode, the control module 104 controls the operations of the first wireless communication module 100 and the second wireless communication module 102 for establishing voice communications with the mobile communication apparatuses 22 and 24 respectively over the cellular network and the wireless local area network. Meanwhile, the control module 104 is capable of exchanging signals of the first wireless communication module 100 and the second wireless communication module 102. In other words, under the first operation mode, cross-network group communication among the mobile communication apparatus 10 and the mobile communication apparatuses 22 and 24 can be achieved based on signal-exchanging operations between the signals of the first wireless communication module 100 and the signals of the second wireless communication module 102.

When the mobile communication apparatus 10 operates in a second operation mode, the control module 104 controls the operations of the first wireless communication module 100 for establishing voice communications with the mobile communication apparatus 22 over the cellular network. That is to say, the mobile communication apparatus 10 performs voice communications only with the mobile communication apparatus 22 under the second operation mode.

When the mobile communication apparatus 10 operates in a third operation mode, the control module 104 controls the operations of the second wireless communication module 102 for establishing voice communications with the mobile communication apparatus 24 over the wireless local area network. That is to say, the mobile communication apparatus 10 performs voice communications only with the mobile communication apparatus 24 under the third operation mode.

When the mobile communication apparatus 10 operates in a fourth operation mode, the control module 104 controls the operations of the first wireless communication module 100 and the second wireless communication module 102 for establishing voice communications with the mobile communication apparatuses 22 and 24 respectively over the cellular network and the wireless local area network. However, the signal exchanging operations between the signals of the first wireless communication module 100 and the signals of the second wireless communication module 102 are not enabled. That is to say, cross-network group communication among the mobile communication apparatus 10 and the mobile communication apparatuses 22 and 24 is non-functional under the fourth operation mode.

When the mobile communication apparatus 10 operates in a fifth operation mode, the control module 104 controls the operations of the first wireless communication module 100 and the second wireless communication module 102 for establishing voice communications with the mobile communication apparatuses 22 and 24 respectively over the cellular network and the wireless local area network. Furthermore, signals of the mobile communication apparatus 22 can be transferred to the mobile communication apparatus 24 via the second wireless communication module 102. That is to say, under the fifth operation mode, the mobile communication apparatus 10 transfers signals of the mobile communication apparatus 22 to the mobile communication apparatus 24 without transferring signals of the mobile communication apparatus 24 to the mobile communication apparatus 22, which means that the mobile communication apparatus 22 is not able to receive the signals of the mobile communication apparatus 24.

When the mobile communication apparatus 10 operates in a sixth operation mode, the control module 104 controls the operations of the first wireless communication module 100 and the second wireless communication module 102 for establishing voice communications with the mobile communication apparatuses 22 and 24 respectively over the cellular network and the wireless local area network. Furthermore, signals of the mobile communication apparatus 24 can be transferred to the mobile communication apparatus 22 via the first wireless communication module 100. That is to say, under the sixth operation mode, the mobile communication apparatus 10 transfers signals of the mobile communication apparatus 24 to the mobile communication apparatus 22 without transferring signals of the mobile communication apparatus 22 to the mobile communication apparatus 24, which means that the mobile communication apparatus 24 is not able to receive the signals of the mobile communication apparatus 22.

The aforementioned six operation modes are utilized to illustrate some possible embodiments of the present invention. Those skilled in the art are able to adjust the operations of the control module 104 to control the operations of the first wireless communication module 100 and the second wireless communication module 102 for other operation modes. Since the mobile communication apparatus 22 is operated under the cellular communication system and the mobile communication apparatus 24 is operated under the VoIP system, the mobile communication apparatus 22 may operate a first group communication provided by the cellular communication system and the mobile communication apparatus 24 may operate a second group communication provided by the VoIP system.

Based on the above description, the mobile communication apparatus 10 is able to provide cross-network group communication between two different communication systems through exchanging signals of the two different communication systems. Therefore, even though there is no cross-link service provided between two different networks, the signal-exchanging operations of the mobile communication apparatus 10 of the present invention are able to cross-link the two different networks via the control module 104, which means that cross-network group communication between different communication systems can be achieved.

Figure 3:
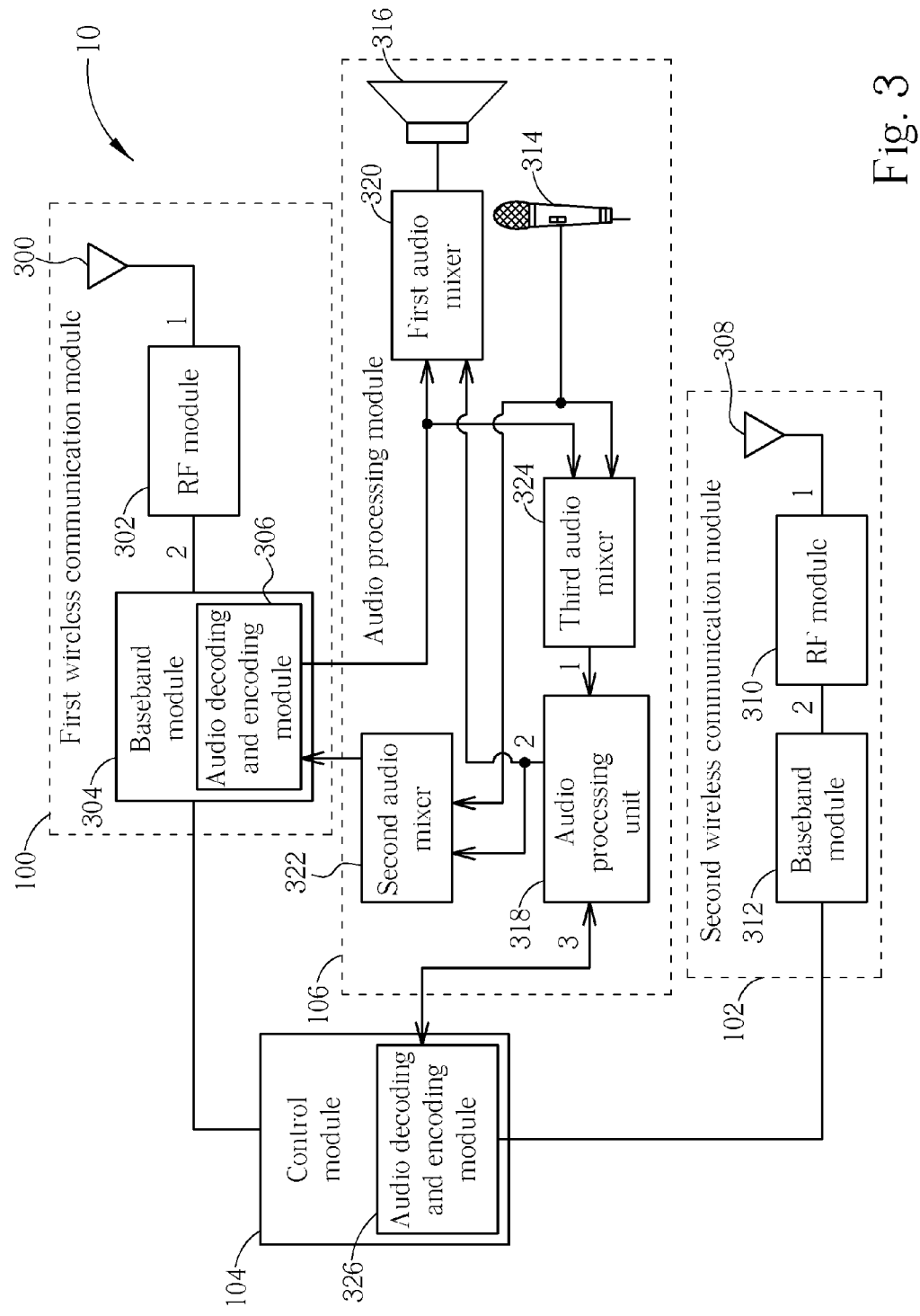
FIG. 3 is a schematic functional block diagram illustrating one preferred embodiment of the mobile communication apparatus shown in FIG. 1.

Please refer to FIG. 3. FIG. 3 is a schematic functional block diagram illustrating one preferred embodiment of the mobile communication apparatus 10 of the present invention. The first wireless communication module 100 comprises an antenna 300, a RF (radio frequency) module 302, and a baseband module 304. The baseband module 304 includes an audio decoding and encoding module 306 for processing signals corresponding to the audio processing module 106.

When the antenna 300 receives signals of the cellular communication system, the RF module 302 performs down-converting and demodulating operations on the received signals to produce base band signals. The base band signals are then inputted to the baseband module 304. The audio decoding and encoding module 306 processes the base band signals to generate audio signals for the audio processing module 106 to play out.

On the contrary, when the mobile communication apparatus 10 performs RF signal transmitting, the audio decoding and encoding module 306 of the baseband module 304 performs encoding and encrypting operations on the signals generated by the audio processing module 106 and produces base band signals. The RF module 302 performs modulating operations on the base band signals to enclose the base band signals in carrier signals and generates RF signals for the antenna 300 to transmit in electromagnetic waves.

In another aspect, the baseband module 304 is able to transfer the signals of the second wireless communication module 102 to the cellular communication system, or transfer audio signals to the second wireless communication module 102 based on the output signals of the control module 104.

The second wireless communication module 102 comprises an antenna 308, a RF module 310, and a baseband module 312. The baseband module 312 includes an audio decoding and encoding module 326. The architecture of the second wireless communication module 102 is similar to the architecture of the first wireless communication module 100 and, for the sake of clarity, further detailed discussion on the operations is omitted. However, since the second wireless communication module 102 is utilized to process data packets from the wireless local area network, the audio decoding and encoding module 326 of the baseband module 312 can therefore be integrated into the control module 104 as shown in FIG. 3, which results in lower production cost.

The audio processing module 106 comprises an audio receiver 314, a speaker 316, an audio processing unit 318, a first audio mixer 320, a second audio mixer 322, and a third audio mixer 324. The audio receiver 314 and the speaker 316 are utilized to receive and play out audio signals respectively. The audio processing unit 318 is utilized to process audio signals. The first audio mixer 320, the second audio mixer 322, and the third audio mixer 324 are utilized to perform audio signal mixing operations. The audio processing unit 318 can also be integrated into the control module 104 (not shown in FIG. 3) for lowering production cost.

When the mobile communication apparatus 10 is operated in the above-mentioned first operation mode for cross-network group communication, signals received by the first wireless communication module 100 undergo down-converting, demodulating, and decoding operations and are converted to analog audio signals by the audio decoding and encoding module 306. The analog audio signals are then furnished to the first audio mixer 320 and the third audio mixer 324. Thereafter, the speaker 316 can play out the analog audio signals processed by the first audio mixer 320. Meanwhile, the analog audio signals are processed by the third audio mixer 324 and the audio processing unit 318 for generating recognizable audio signals for the audio decoding and encoding module 326. Subsequently, the second wireless communication module 102 transmits the signals received by the first wireless communication module 100 to the VoIP system.

On the contrary, signals received by the second wireless communication module 102 undergo down-converting, demodulating, and decoding operations and are converted to analog audio signals by the audio processing unit 318. The analog audio signals are then furnished to the first audio mixer 320 and the second audio mixer 322. Thereafter, the speaker 316 can play out the analog audio signals processed by the first audio mixer 320. Meanwhile, the second audio mixer 322 transfers the analog audio signals to the audio decoding and encoding module 306. Subsequently, the first wireless communication module 100 transmits the signals received by the second wireless communication module 102 to the cellular communication system.

In another aspect, voice signals received by the audio receiver 314 are converted to audio signals. The audio signals can be transferred to the cellular communication system via the second audio mixer 322 and the first wireless communication module 100. The audio signals can also be transferred to the VoIP system via the third audio mixer 324, the audio processing unit 318, the control module 104, and the second wireless communication module 102. Therefore, group communication among different communication systems can be achieved. Other operation modes of the mobile communication apparatus 10 can be understood in a similar manner described above and, for the sake of brevity, further discussion on other operation modes is omitted.

It should be noted that although the mobile communication apparatus 10 according to the present invention has been described with reference to one preferred embodiment shown in FIG. 3, other types of technology capable of achieving the same functionality can be used while remaining within the scope of the present invention.

In summary, the mobile communication apparatus of the present invention is able to combine the advantages of both the cellular communication system and the VoIP system. Moreover, although there is no cross-link service provided by the cellular communication system and the VoIP system, the mobile communication apparatus of the present invention is able to provide cross-network group communication between the cellular communication system and the VoIP system by performing signal-exchanging operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile communication apparatus performing group communication between a cellular communication system and a VoIP system, comprising:
   a first wireless communication module for processing signals of a cellular network corresponding to the cellular communication system;
   a second wireless communication module for processing signals of a wireless local area network (WLAN) corresponding to the Voice over Internet Protocol (VoIP) system; and
   a control module, coupled to the first wireless communication module and the second wireless communication module, for establishing voice communications with the cellular network and the WLAN through the first wireless communication module and the second wireless communication module, and for exchanging signals of the first wireless communication module and the second wireless communication module when the mobile communication apparatus operates in a first operation mode;
   wherein the control module establishes voice communications with the cellular network through the first wireless communication module and establishes voice communications with the WLAN through the second wireless communication module, and signals of the first wireless communication module are transferred to the WLAN through the second wireless communication module and signals of the second wireless communication module are not transferred to the cellular network when the mobile communication apparatus operates in a fifth operation mode;
wherein the control module establishes voice communications with the cellular network through the first wireless communication module and establishes voice communications with the WLAN through the second wireless communication module, and signals of the second wireless communication module are transferred to the cellular network through the first wireless communication module and signals of the first wireless communication module are not transferred to the WLAN when the mobile communication apparatus operates in a sixth operation mode.

2. The mobile communication apparatus of claim 1, wherein the control module establishes voice communications only with the cellular network through the first wireless communication module when the mobile communication apparatus operates in a second operation mode.

3. The mobile communication apparatus of claim 1, wherein the control module establishes voice communications only with the WLAN through the second wireless communication module when the mobile communication apparatus operates in a third operation mode.

4. The mobile communication apparatus of claim 1, wherein the control module establishes voice communications with the cellular network through the first wireless communication module and establishes voice communications with the WLAN through the second wireless communication module when the mobile communication apparatus operates in a fourth operation mode.

5. The mobile communication apparatus of claim 1, wherein the first wireless communication module comprises:
an antenna;
a radio frequency (RF) module, comprising a first terminal coupled to the antenna and a second terminal; and
a baseband module, coupled between the second terminal of the RF module and the control module, for processing base band signals corresponding to the cellular network.

6. The mobile communication apparatus of claim 5, wherein the baseband module comprises an audio decoding and encoding module for processing audio signals.

7. The mobile communication apparatus of claim 1, wherein the second wireless communication module comprises:
an antenna;
an RF module, comprising a first terminal coupled to the antenna and a second terminal; and
a baseband module, coupled between the second terminal of the RF module and the control module, for processing base band signals corresponding to the WLAN.

8. The mobile communication apparatus of claim 7, wherein the baseband module comprises an audio decoding and encoding module for processing audio signals.

9. The mobile communication apparatus of claim 8, wherein the audio decoding and encoding module is integrated into the control module.

10. The mobile communication apparatus of claim 1, further comprising:
an audio processing module for receiving and playing out audio signals.

11. The mobile communication apparatus of claim 10, wherein the audio processing module comprises:
an audio receiver for receiving audio signals;
a speaker for playing out audio signals;
an audio processing unit, comprising a first terminal, a second terminal, and a third terminal coupled to the control module, utilized to receive audio signals via the first terminal and output encoded audio signals via the third terminal, and to receive signals via the third terminal and output decoded signals via the second terminal;
a first audio mixer, coupled to the second terminal of the audio processing unit, the first wireless communication module and the speaker;
a second audio mixer, coupled to the second terminal of the audio processing unit, the first wireless communication module, and the audio receiver; and
a third audio mixer, coupled to the first terminal of the audio processing unit, the first wireless communication module, and the audio receiver.

12. The mobile communication apparatus of claim 11, wherein the audio processing unit is integrated into the control module.

13. The mobile communication apparatus of claim 1, wherein the cellular communication system is a Global System for Mobile Communications (GSM), a Code Division Multiple Access (CDMA) system, or a Wideband Code Division Multiple Access (WCDMA) system.

* * * * *